United States Patent [19]

Ozawa

[11] Patent Number: 5,148,106
[45] Date of Patent: Sep. 15, 1992

[54] ANGLE DETECTION SENSOR WITH SETTING OF RATIO OF MAGNETIC FORCES OF ROTATING MAGNET AND BIAS MAGNET

[75] Inventor: Hiromasa Ozawa, Himeji, Japan
[73] Assignee: Mitsubishi Denki K.K., Tokyo, Japan
[21] Appl. No.: 710,634
[22] Filed: Jun. 5, 1991

[30] Foreign Application Priority Data

Jul. 6, 1990 [JP] Japan ................................. 2-180209

[51] Int. Cl.⁵ .......................... G01B 7/30; G01R 33/06
[52] U.S. Cl. ........................... 324/207.21; 324/207.12; 324/207.25; 324/252
[58] Field of Search .................. 324/173, 174, 207.12, 324/207.2, 207.21, 207.25, 252; 338/32 R

[56] References Cited

U.S. PATENT DOCUMENTS 4,283,679  8/1981  Ito et al. .................. 324/207.21 X
5,055,781  10/1991  Sakakibara et al. ............ 324/207.21

*Primary Examiner*—Gerard R. Strecker
*Attorney, Agent, or Firm*—Sughrue, Mion, Zinn Macpeak & Seas

[57] ABSTRACT

The present invention relates to an angle detection sensor including: a magnetoresistive element in which a bias magnet is laminated on a magnetic pattern resistance layer of a thin film ferromagnetic material, and a permanent magnet fixed to a rotation shaft which rotates about the center of the magnetoresistive element. In particular, when a rotation angle of the permanent magnet is large, a ratio of a first magnetic force of said permanent magnet to a second magnetic force of said bias magnet is set to be smaller than 1, and, when the rotation angle of the permanent magnet is small, the ratio of the first magnetic force of the permanent magnet to the second magnetic force of the bias magnet is set to be larger than 1.

5 Claims, 7 Drawing Sheets

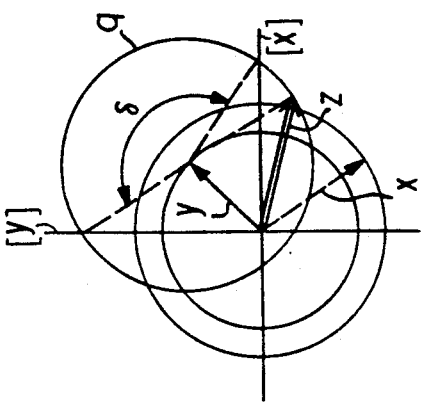
FIGURE 2A  $b/a < 1/\sqrt{2}$
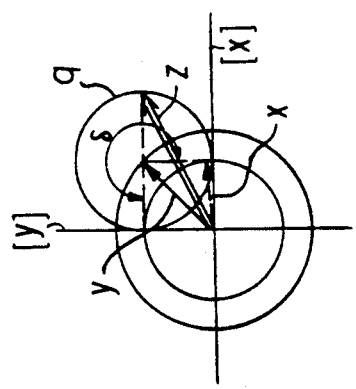
FIGURE 2B  $b/a = 1/\sqrt{2}$
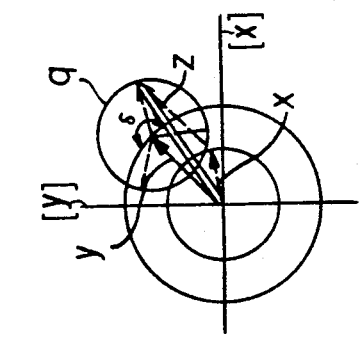
FIGURE 2D  $b/a > 1$
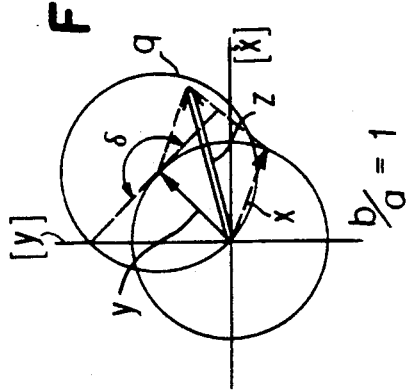
FIGURE 2C  $b/a = 1$

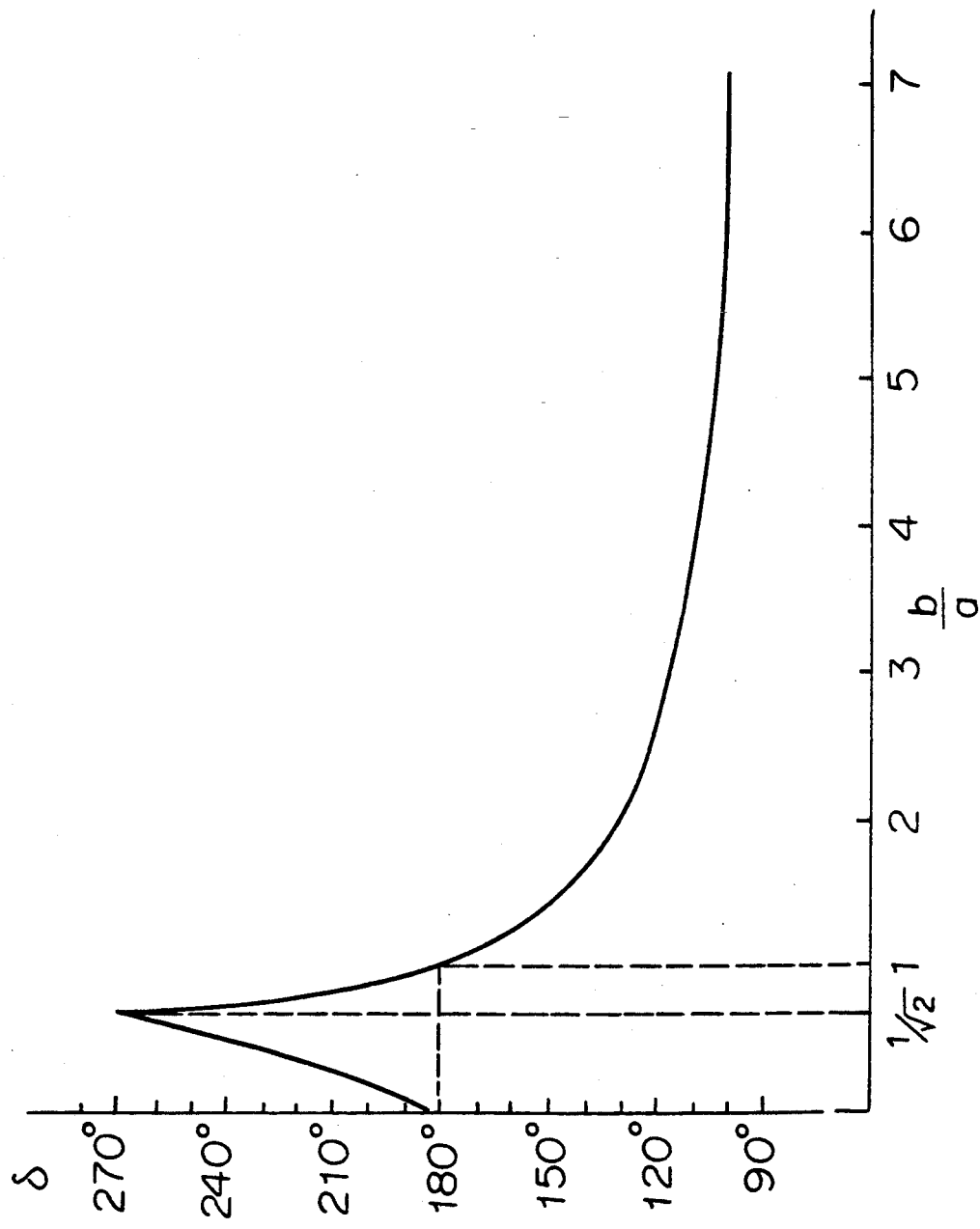

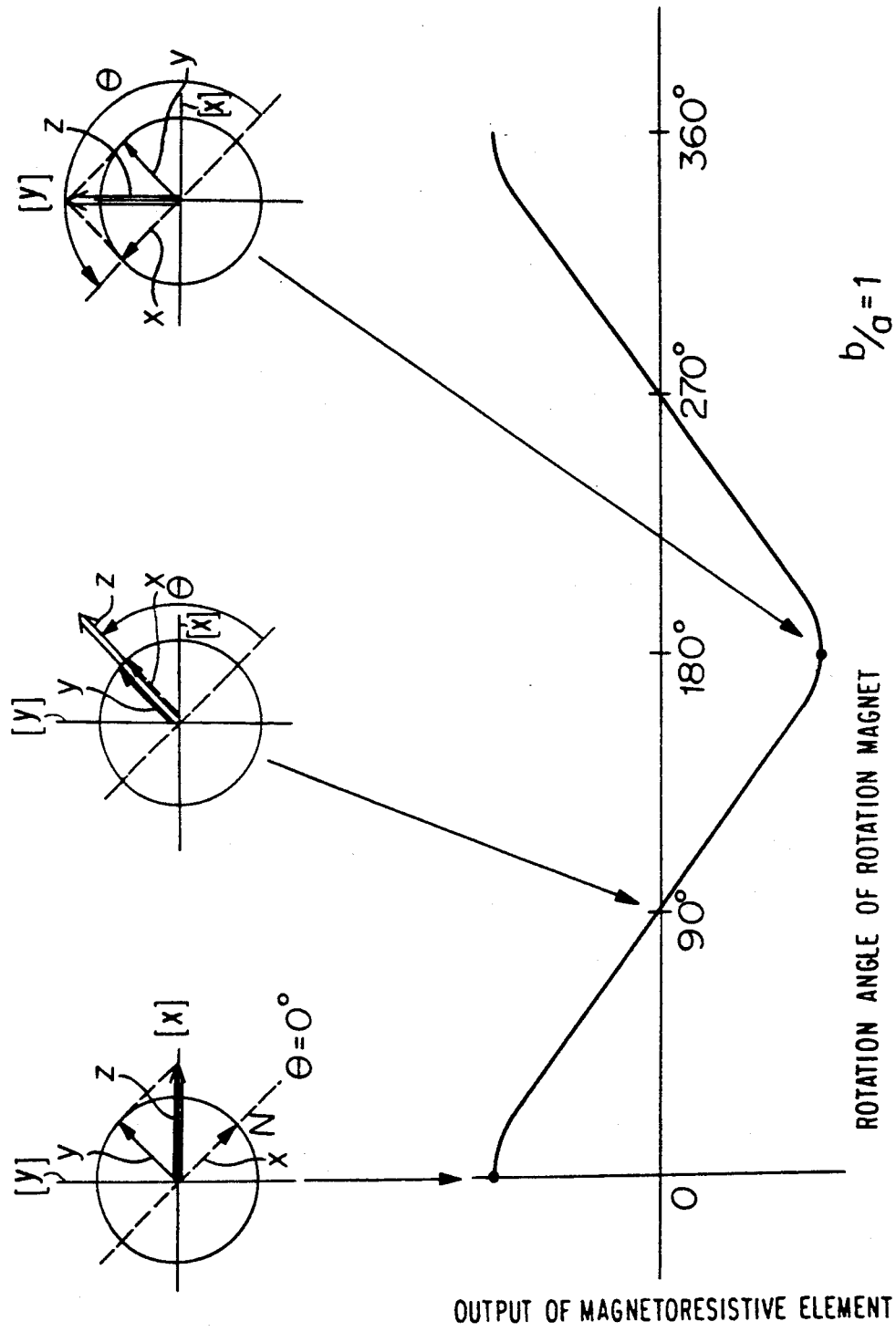

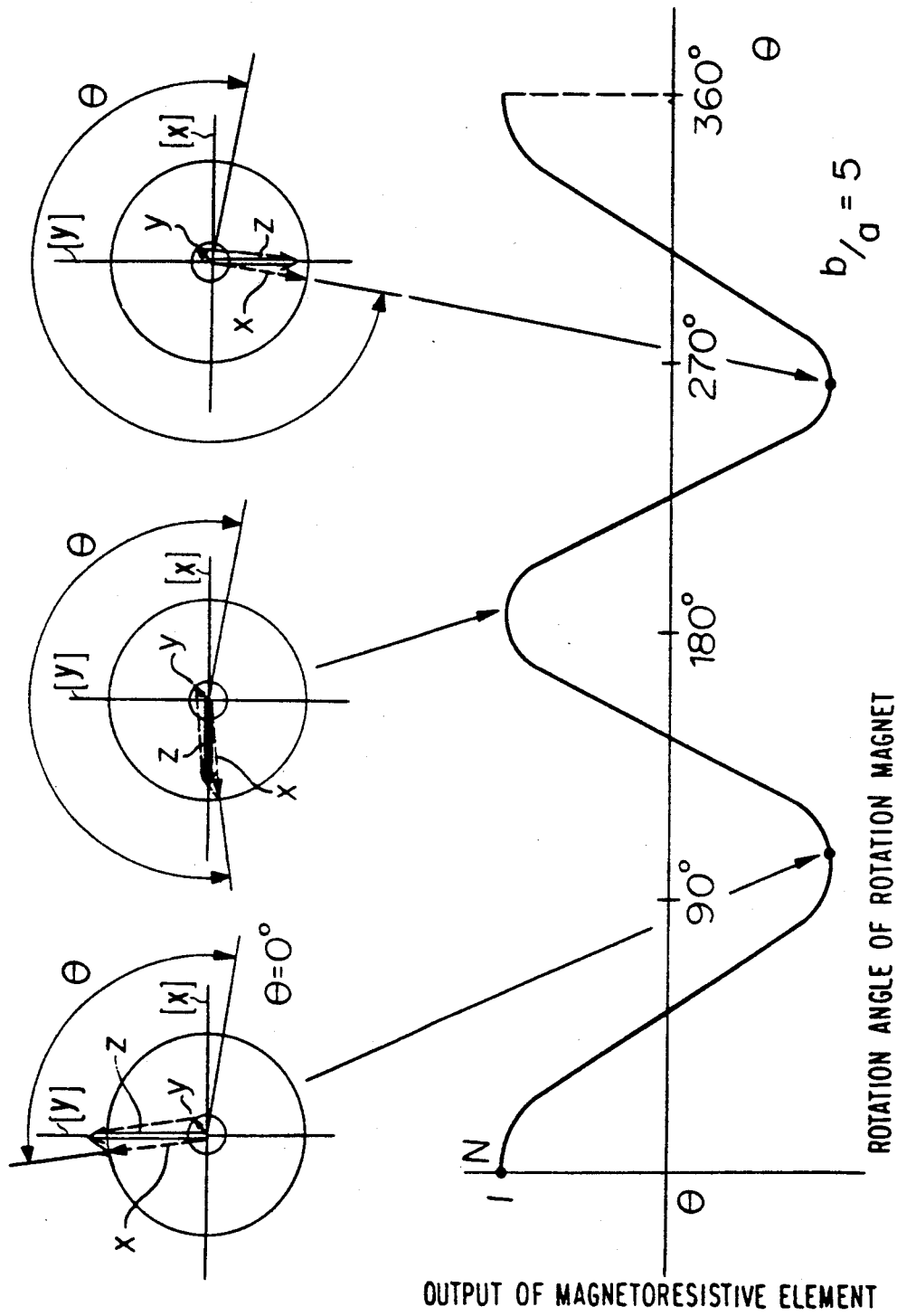

ANGLE DETECTION SENSOR WITH SETTING OF RATIO OF MAGNETIC FORCES OF ROTATING MAGNET AND BIAS MAGNET

BACKGROUND OF THE INVENTION

1. Field of the Invention

This invention relates to an angle detection sensor.

2. Discussion of Background

A conventional rotation angle sensor is disclosed in Japanese Unexamined Patent Publication No. 110215/1989. This rotation angle sensor is composed of a magnetoresistive element in which a bias magnet is laminated on a magnetic pattern resistance layer of a thin film ferromagnetic material, and a pair of permanent magnets are fixed to a rotation shaft which is disposed for rotation about a center of, and which is orthogonal to an upper surface of the magnetoresistive element. The magnets surround the magnetoresistive element by about equal distances, and poles having different polarities are positioned to face each other. The rotation angle of the permanent magnets is detected as a linear electric signal change.

However, in the above rotation angle sensor, magnetic properties are affected in accordance with the set position of the permanent magnet. Furthermore, the set position is often difficult to adjust properly.

SUMMARY OF THE INVENTION

It is an object of the present invention to provide an angle detection sensor capable of easily adjusting the magnetic forces or the set positions of the permanent magnets or bias magnet.

According to one aspect of the present invention, an angle detection sensor is provided comprising:

a magnetoresistive element in which a bias magnet is laminated on a magnetic pattern resistance layer of a thin film ferromagnetic material; and a permanent magnet being fixed to a rotation shaft which rotates about the center of the magnetoresistive element;

wherein a ratio of a first magnetic force of said permanent magnet to a second magnetic force of said bias magnet is set to be smaller than 1 for large rotation angles; and the ratio of the first magnetic force of the permanent magnet to the second magnetic force of the bias magnet is set to be larger than 1 for small rotation angles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A to 2D are diagrams showing the relationship between the ratio of a magnetic force of a pair of permanent magnets to a bias magnet, and a synthesized magnetic field;

FIG. 3 is a diagram showing the relationship between the above ratio and a rotation angle for a predetermined change in the direction of the synthesized magnetic filed;

FIG. 4 is a diagram showing the relationship between the rotation angle and an output of the magnetoresistive element for the same predetermined change in direction where the above ratio is 1;

FIG. 6 is a diagram showing the relationship between the rotation angle and an output of the magnetoresistive element for the same predetermined change in direction where the above ratio is 5;

DETAILED DESCRIPTION OF THE PREFERRED EMBODIMENTS

Figure 1:
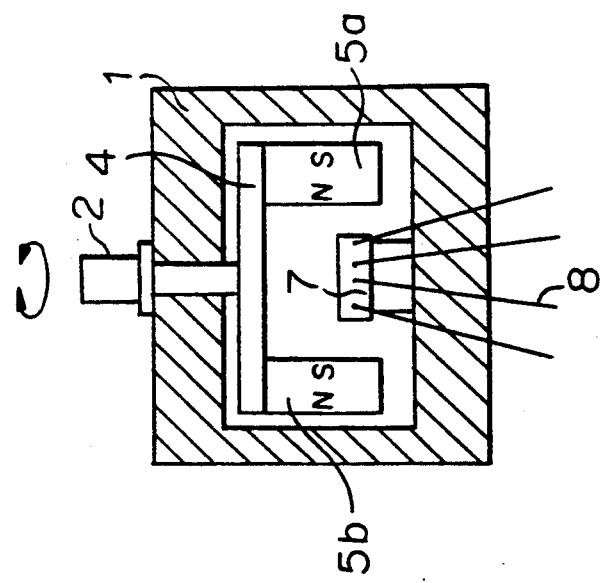
FIG. 1 is a vertical sectional diagram showing a first embodiment of an angle detection sensor according to the present invention.

Referring to the drawings, explanation will be given to embodiments of the present invention. FIG. 1 is a vertical sectional diagram showing a first embodiment of an angle detection sensor according to the present invention. A numeral 1 designates a case, 2, a rotation shaft rotatably supported by the case 1, which is to be connected to a rotation part of various instruments. A numeral 4 designates a magnet holder attached to the rotation shaft 2 in the case 1, 5a and 5b, a pair of permanent magnets oppositely fixed to the magnet holder 4, with opposite poles facing each other and 7, a magnetoresistive element in which a bias magnet is laminated on a magnetic pattern resistance layer of a thin film ferromagnetic material, which is installed at the center of the pair of permanent magnets 5a and 5b, that is, coaxially with the rotation shaft 2. The magnetic poles of the bias magnet lie in the plane of the magnetoresistive element along an axis perpendicular to the axis of rotation of the rotation shaft. A numeral 8 designates an output lead wire which is connected to the magnetoresistive element 7.

In the above construction, an electric output is obtained from the output lead wire 8, which is proportional to the rotation angle of the pair of permanent magnets 5a and 5b.

Assuming that a magnetic force of the bias magnet is "a", and a magnetic force of the pair of permanent magnets 5a and 5b is "b", then the relationship between "a" and "b" is shown in FIGS. 2A to 2D. FIG. 2A shows the case of $a \times 1/\sqrt{2} > b$, that is, $b/a < 1/\sqrt{2}$, in which, "x" is a vector which represents the magnetic force and the direction of the pair of permanent magnets 5a and 5b, "y", the magnetic force and the direction of the bias magnet, "z", the magnetic force and the direction of a synthesized magnetic field, resulting from the combination of the fields "x" and "y" and "q", a locus described by the synthesized magnetic field. The locus is constructed with its centerpoint being the endpoint of vector "y" and with a radius equal to the magnitude of vector "x". Furthermore, FIG. 2B shows the case of $b/a = 1/\sqrt{2}$, FIG. 2C, the case of $b/a = 1$, and FIG. 2D, the case of $b/a > 1$.

FIG. 3 shows the relationship between b/a and the rotation or mechanical oscillation angle δ of the pair of permanent magnets 5a and 5b when the synthesized magnetic field moves 90° from the positive x-axis to the positive y-axis as shown in FIGS. 2A–2D. As shown in FIG. 3, δ has a peak when $b/a = 1/\sqrt{2}$, the change before and after the peak is large when b/a becomes either larger or smaller than the peak. Furthermore, when b/a is more than 3, the change in δ approaches zero. The above relationships are established for a range in which the magnetoresistive element 7 is not saturated.

Figure 5:
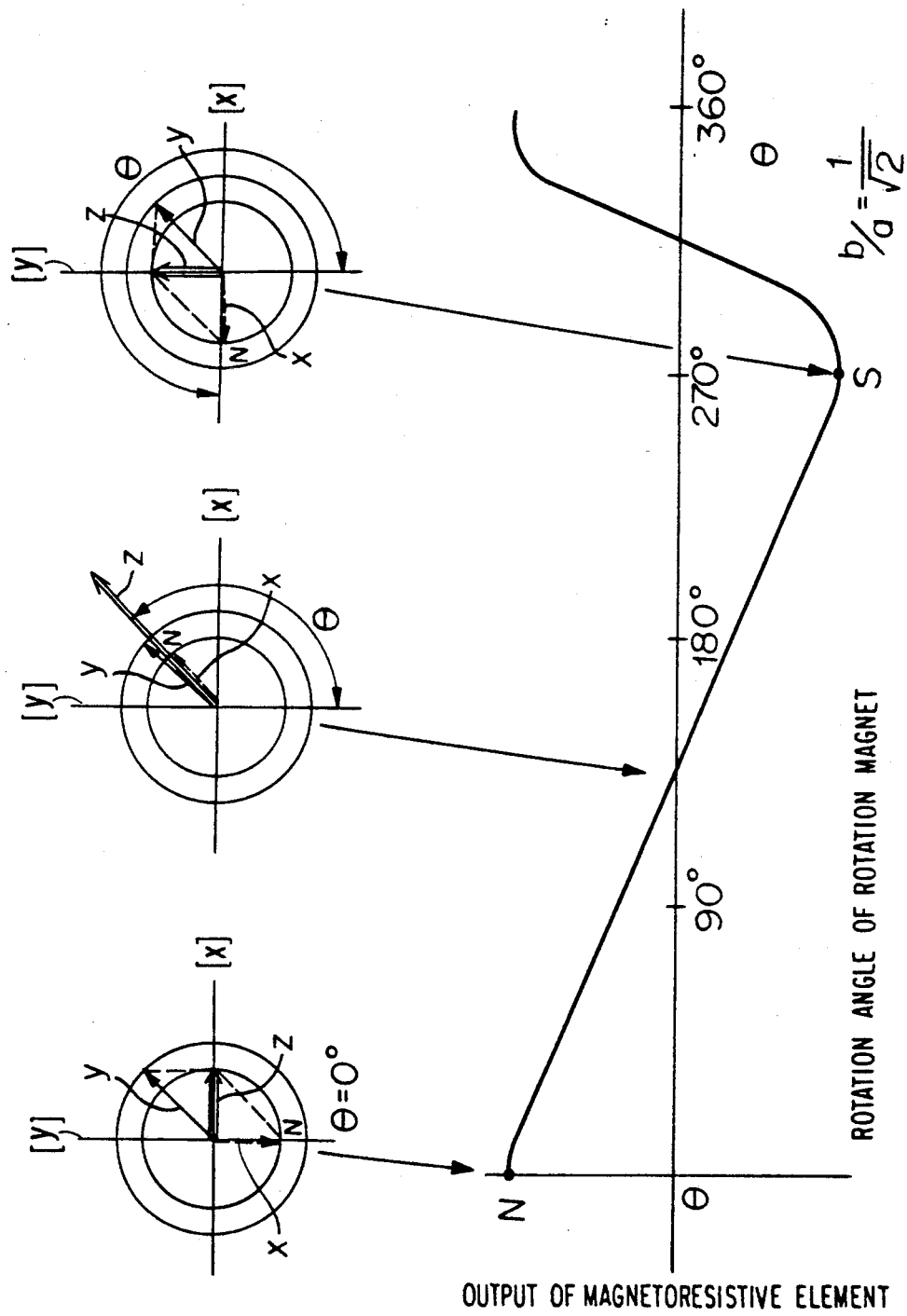
FIG. 5 is a diagram showing the relationship between the rotation angle and an output of the magnetoresistive element for the same predetermined change in direction where the above ratio is $1/\sqrt{2}$.

FIG. 4 shows a relationship between the rotation angle or mechanical oscillation angle θ of a rotation magnet, that is, the pair of permanent magnets 5a and 5b, and an output of the magnetoresistive element 7 for b/a=1. FIG. 5 shows the same relationship for $b/a = 1/\sqrt{2}$. FIG. 6 shows the same relationship for b/a=5. To obtain the output shown in FIG. 4, b/a=1. When b/a is deviated from 1, as shown in FIG. 3, the change of δ is large, and the adjustment is, accordingly, difficult. When b/a is set to be 1 or greater, even if the ratio of b/a deviates from the design value, as shown in FIG. 3, the corresponding deviation of the rotation angle is small. For example, when b/a=2, the rotation angle is 130°, and when b/a=4, the rotation angle is 110°. Thus, even if the value of b/a is doubled, the change in the rotation angle is only 20°.

In accordance with the above described relationship (See FIG. 3), b/a should be less than 1 for large angles of rotation (i.e., more than 180°) and greater than 1 for small angles of rotation (i.e., less than 180°). In this manner, unexpected changes in the ratio b/a or the rotation angle will not adversely affect the output of the magnetoresistive element.

Furthermore, in the first embodiment shown in FIG. 1, by adjusting the magnetic force of the pair of permanent magnets 5a and 5b, or the distance between the permanent magnet and the magnetoresistive element 7, the ratio b/a may be changed to conform with an expected angle of rotation. The rotation angle of the permanent magnets 5a and 5b is fixed to a certain degree depending on the particular usage of the sensor. Thus, a proper ratio for b/a can be selected in accordance with the predicted value for the angle of rotation such that a proper output of the magnetoresistive element is attained.

Figure 7:
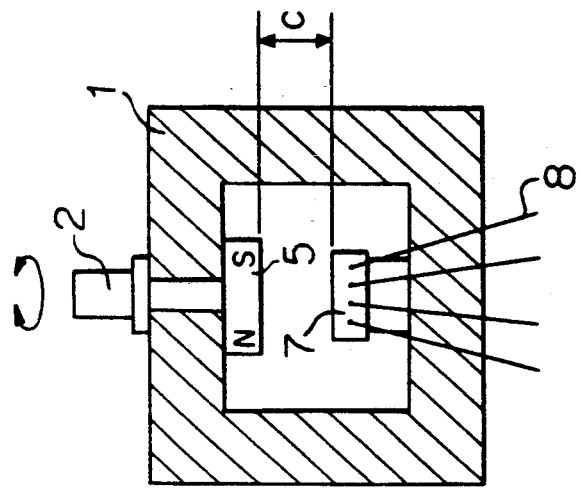
FIG. 7 is a vertical, sectional diagram showing a second embodiment of the angle detection sensor according to the present invention.

FIG. 7 shows a second embodiment of the present invention. In this embodiment, a single permanent magnet 5 is disposed above the magnetoresistive element 7, coaxially with the rotation shaft 2. By adjusting the distance c between the permanent magnet 5 and the magnetoresistive element 7, the ratio b/a can be changed in accordance with the relationships described above (See FIG. 3).

Figure 8A:
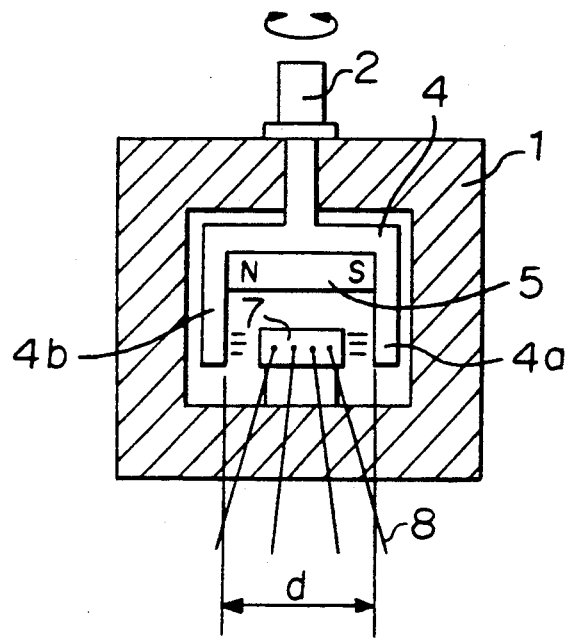
FIGS. 8A and 8B are a vertical sectional diagram and a bottom view of a third embodiment of the angle detection sensor according to the present invention.
Figure 8B:
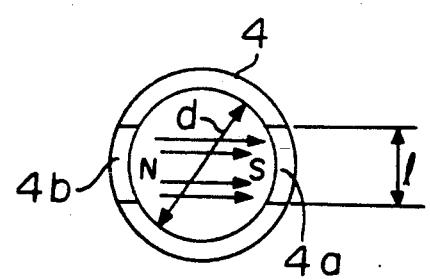

Furthermore, FIGS. 8A and 8B show a third embodiment of the present invention. In this embodiment, a single permanent magnet 5 is attached to the magnet holder 4, coaxially with the rotation shaft 2. The protrusions 4a and 4b are formed on the cylindrical magnet holder 4, which are disposed at both sizes of the magnetoresistive element 7. By adjusting the distance d and the width l of the protrusions 4a and 4b, the ratio b/a can be changed in accordance with the relationships described above (See FIG. 3). condition is satisfied.

As stated above, according to the present invention, the ratio of the magnetic force of the permanent magnet to the magnetic force of the bias magnet is set as smaller than 1, when the rotation angle of the permanent magnet is expected to be large. When the rotation angle is expected to be small, the ratio b/a is set as larger than 1.

Accordingly, even if there is a variation in some degree in the magnetic forces of the permanent magnet or the bias magnet, and the set position thereof, the output of the magnetoresistive element is affected only slightly, which facilitates an adjustment during production of the angle sensor.

Obviously, numerous modifications and variations of the present invention are possible in light of the above teachings. It is therefore to be understood that within the scope of the appended claims, the invention may be practiced otherwise than as specifically described herein.

What is claimed is:

1. An angle detection sensor comprising:
    a planar, magnetoresistive, magnetic field sensing element in which a bias magnet is laminated on a magnetic pattern resistance layer of a thin film ferromagnetic material;
    a rotatably supported rotation shaft spaced from said magnetoresistive element and rotatable about a center line of said magnetoresistive element, which center line is orthogonal to the plane of said magnetoresistive element; and
    a permanent magnet fixed to said rotation shaft for rotation about said center line of the magnetoresistive element;
    wherein when a rotation angle of the permanent magnet is greater than a predetermined amount, a ratio of a first magnetic force of said permanent magnet to a second magnetic force of said bias magnet is set to be smaller than 1; and
    wherein when a rotation angle of the permanent magnet is less than a predetermined amount, the ratio of the first magnetic force to the second magnetic force is set to be larger than 1.

2. The angle detection sensor according to claim 1, wherein said permanent magnet comprises a pair of permanent magnets.

3. The angle detection sensor according to claim 1, wherein said predetermined amount is 180°.

4. The angle detection sensor according to claim 2, wherein said predetermined amount is 180°.

5. The angle detection sensor according to claim 1, wherein said permanent magnet is surrounded by protrusions which extend downwardly to surround said magnetoresistive element.

* * * * *